United States Patent [19]
Ito et al.

[11] Patent Number: 4,742,762
[45] Date of Patent: May 10, 1988

[54] AIR CONDITIONING APPARATUS FOR AUTOMOTIVE VEHICLES

[75] Inventors: Toshikazu Ito, Ibaraki; Takashi Degawa, Mito, both of Japan

[73] Assignee: Hitachi, Ltd., Tokyo, Japan

[21] Appl. No.: 2,219

[22] Filed: Jan. 12, 1987

[30] Foreign Application Priority Data

Jan. 13, 1986 [JP] Japan ................ 61-3440

[51] Int. Cl.$^4$ .............................. B60H 1/26
[52] U.S. Cl. .................... 98/2.05; 98/2.08; 165/42
[58] Field of Search ............ 98/2.05, 2.06, 2.07, 98/2.08, 2.11; 165/42, 43; 237/123 B

[56] References Cited

U.S. PATENT DOCUMENTS

| 4,356,965 | 11/1982 | Matsushima et al. | 165/42 X |
| 4,531,671 | 7/1985 | Schwenk | 98/2.06 X |
| 4,562,954 | 1/1986 | Kajita | 165/42 X |
| 4,615,357 | 10/1986 | Ito | 165/43 X |
| 4,665,971 | 5/1987 | Sakurai | 165/42 X |

FOREIGN PATENT DOCUMENTS

| 2655554 | 6/1978 | Fed. Rep. of Germany | 98/2.08 |
| 3039148 | 4/1981 | Fed. Rep. of Germany | 98/2.05 |
| 3016679 | 11/1981 | Fed. Rep. of Germany | 98/2.11 |
| 11436 | 2/1978 | Japan | 98/2.11 |
| 26008 | 2/1982 | Japan | 165/42 |
| 37008 | 3/1982 | Japan . | |
| 209415 | 12/1982 | Japan | 165/42 |
| 2107855 | 5/1983 | United Kingdom | 98/2.06 |

Primary Examiner—Harold Joyce
Attorney, Agent, or Firm—Antonelli, Terry & Wands

[57] ABSTRACT

An air conditioning apparatus of an air mix type for automotive vehicles includes a casing formed therein with an air passageway, a heating device mounted in the air passageway and an air mix door mechanism for suitably regulating air flowing through the heating device and air bypassing the same, and is adapted to provide an air mix or conditioned air by mixing warm air with cool air in suitable proportions so as to release the conditioned air of desired temperature through air outlets formed in the casing. The air passageway in the casing is divided along the direction of flow of the air to define a cool air heating passageway in which the heating device is disposed and a cool air passageway which is connected to the air outlets to directly lead the cool air thereto. The cool air passageway is equipped with a door mechanism for opening and closing the cool air passageway.

4 Claims, 8 Drawing Sheets

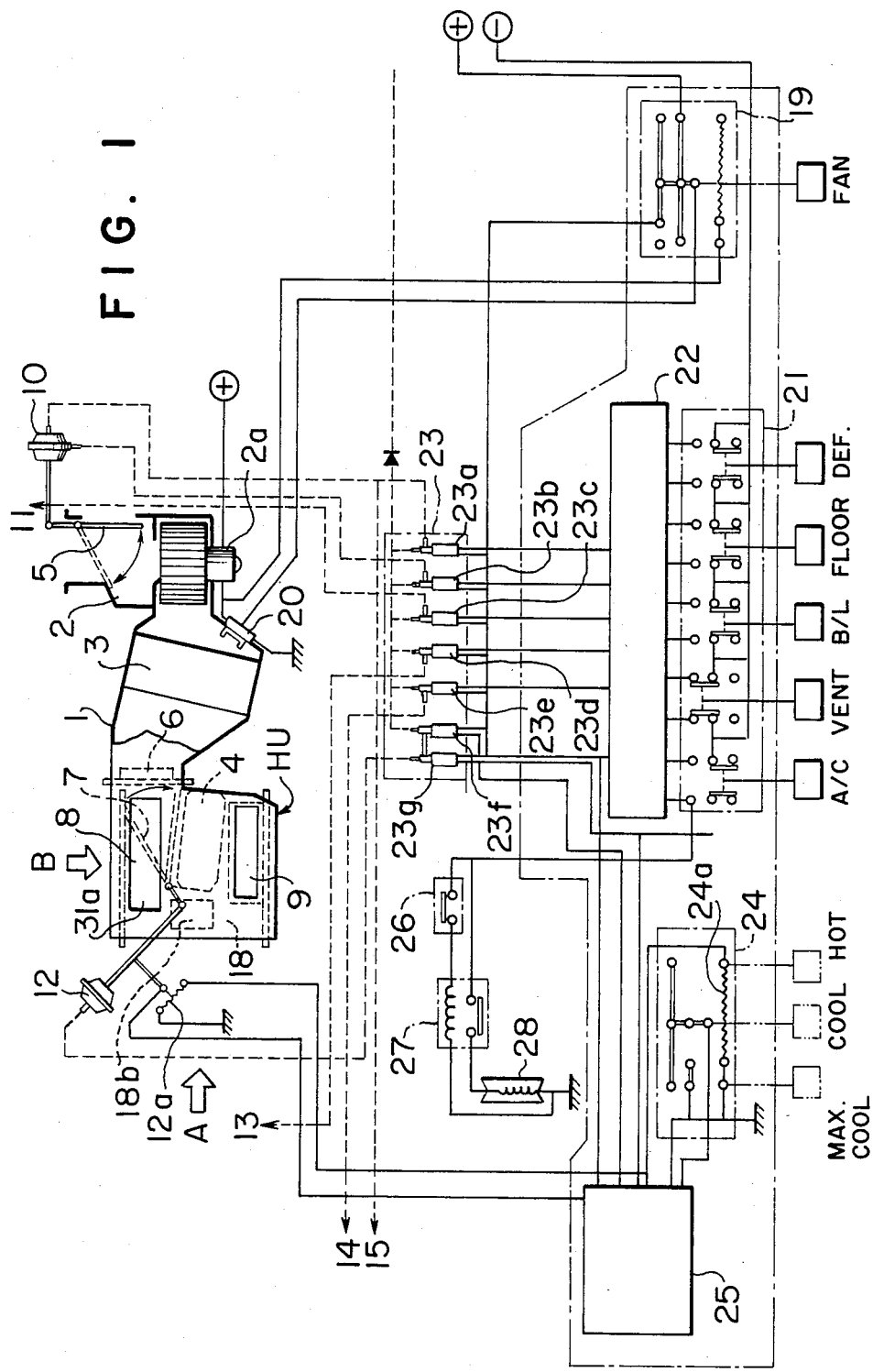

AIR CONDITIONING APPARATUS FOR AUTOMOTIVE VEHICLES

BACKGROUND OF THE INVENTION

This invention relates to an air conditioning apparatus of an air mix type for automotive vehicles.

A conventional apparatus of this type comprises a heater device, such as a heater core, located in an air passageway, and is adapted to mix warm air, which has flowed though the heater device, in suitable proportions with cool air that has bypassed the heating device, to produce conditioned air of a desired temperature. In the conventional apparatus, resistance offered to an air current flowing through the air passageway in which the heating device is located differs from that offered to an air current flowing through the air passageway that bypasses the heating device, so that it is desirable to provide means for reducing the cool air current in vigor to improve the condition for mixing the cool air current with the warm air current. On the other hand, it has been desired to reduce as much as possible the resistance offered to an air current by the air passageways to minimize noises that might be generated when the apparatus is operated to produce the conditioned air, particularly when operated in a maximum cooling mode. It is also necessary to reduce the resistance of the air passageway in order to economize on the consumption of power for operating a blower motor.

Japanese Patent Unexamined Publication No. 37008/82 discloses an air conditioning apparatus of a reheat air mix type for automotive vehicles having the construction in which an auxiliary cool air passageway is defined outside the air passageway for leading cool air directly to air outlets. This construction is intended to cause a differential to occur in temperature between air currents directed towards the driver's seat and the seat for a passenger adjacent the driver, and no consideration is given to the reducing of the resistance offered to a cool air current by maximizing the opening of the passageway for the exclusive use of the cool air current. In addition, since the auxiliary cool air passageway is located outside the air passageway, the problem is raised that the apparatus becomes large in volume and narrows the space in the vehicle for riders.

SUMMARY OF THE INVENTION

This invention has an object of providing an air conditioning apparatus suitable for use in automotive vehicles which is capable of controlling the temperature of an air mix or conditioned air satisfactorily and of minimizing noises which are produced when the apparatus is operated to release the conditioned air while the volume of the apparatus is minimized.

To accomplish the aforesaid object, according to the invention, there is provided an air conditioning apparatus for automotive vehicles comprising heater means located in an air passageway in a casing, and air mix door means for suitably adjusting the flow rate of air passing through the heater means and the flow rate of air bypassing the heater means to provide an air mix or conditioned air of desired temperature which is released through air outlets formed in the casing, wherein a cool air heating passageway and a cool air passageway are provided by dividing the air passageway in the casing along the direction of flow of air, the cool air heating passageway has the heater means and the air mix door means mounted therein, and the cool air passageway is connected to air outlets and has door means for opening and closing the cool air passageway.

Preferably, the cool air heating passageway may include means for enhancing the mixing of cool air with warm air located upstream of an air outlet for the cool air heating passageway. Also preferably, the door means for opening and closing the cool air passageway may be adapted to be brought to an open position, when the apparatus is operated in a maximum cooling mode.

The above object and feature of the invention, and other objects, features and advantages of the invention will become more apparent from the description of an embodiment of the invention set forth hereinafter when considered in conjunction with the accompanying drawings.

BRIEF DESCRIPTION OF THE DRAWINGS

FIG. 1 is a schematic view of the whole of the air conditioning apparatus for automotive vehicles according to one embodiment of the invention and the control system therefor;

DETAILED DESCRIPTION OF PREFERRED EMBODIMENT

Figure 1A:
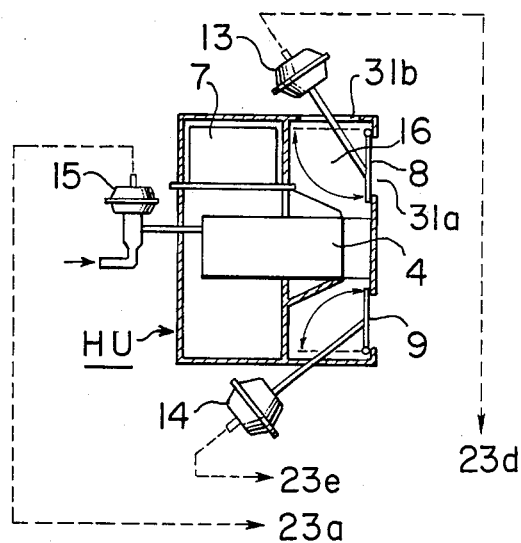
FIGS. 1a and 1b are schematic views of the heater unit of the embodiment shown in FIG. 1 as viewed in the directions of arrows A and B in FIG. 1 respectively.

FIG. 1 shows the whole structure of the air conditioning apparatus for automotive vehicles according to a preferred embodiment of the invention. The apparatus will be described as being of reheat air mix type, it is to be understood that the invention is not limited to this specific type and that it can also have application in an air conditioning apparatus of an air mix type.

The air conditioning apparatus shown in FIG. 1 comprises a duct casing 1 formed of heat resistant material, such as synthetic resinous material. The duct casing is adapted to be mounted below a dashboard of an automotive vehicle, for example. The casing 1 is formed at one end portion thereof with an air inlet 2 and at an opposite end portion of the casing with air outlets for releasing air into the interior of the vehicle. An air passageway is defined between the air inlet 2 and the air outlets for air introduced through the air inlet 2 to flow therethrough. An indoor/outdoor air change-over door 5 is mounted at the air inlet 2 for switching the operation of the apparatus between air introduction modes in one of which the air in the interior of the vehicle is used for circulation and in the other of which air is introduced from the outside of the vehicle into the casing 1, when air conditioning is performed. Blower means 2a is mounted in a portion of the air passageway downstream of the air inlet 2. The blower means 2a of this embodiment comprises a blower and an electric motor for driving the blower.

An evaporator 3 is located in a portion of the air passageway downstream of the blower means 2a. Also located in the air passageway in portions thereof downstream of the evaporator 3 are heater means 4 comprising a heater core, a cooling change-over door 6 and an air mix door 7. The evaporator 3 extends across the air passageway and is connected to a refrigeration circuit, not shown, to cool all the air introduced into the casing 1 and remove moisture therefrom. Cooling water for cooling the engine of the vehicle is introduced into the heater core which uses the cooling water as a heat source for reheating the cool air flowing through the heater core. The evaporator 3 and heater means 4 are of known constructions, so that the detailed description thereof shall be omitted.

Figure 1B:
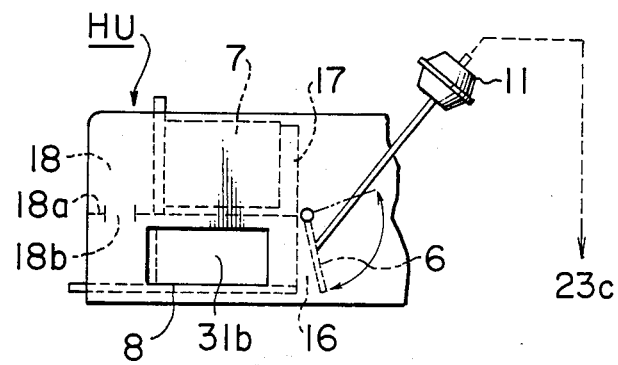

FIGS. 1a and 1b show a heater unit HU of the apparatus for housing, the heater means 4 as viewed in the direction of arrows A and B, respectively, in FIG. 1. As shown in these figures and FIG. 2, the air passageway in the heater unit HU is divided or partitioned along the direction of flow of the air introduced in the casing to define a cool air passageway 16 and a cool air heating passageway 17. The cooling change-over door 6 is disposed at an inlet portion of the cool air passageway 16 to open and close the same. The cool air passageway 16 has a vent outlet 31a formed at one side of the passageway and a defroster outlet 31b at a top of the passage, and a vent-defroster change-over door 8 is provided so as to selectively open and close the vent outlet 31a and defroster outlet 31b.

Meanwhile, the cool air heating passageway 17 has a passageway portion extending downwardly and extends along the passageway 16 to an air mix chamber 18 formed on the downstream side of the passageway. The heater means 4 is located in the downwardly extending portion of the passageway 17, so as to define a path of air extending through the heater means 4 to the air mix chamber 18 and a path leading to the chamber 18 by bypassing the heater means 4. The air mix door 7 is mounted in the cool air heating passageway 17 to be pivotally movable between two positions. In one position, the air mix door 7 covers the heater means 4 to open the bypass path so as to permit the cool air introduced into the passageway 17 flowing as it is toward the downstream side without being heated. In the other position, the door 7 closes the bypass path to direct all the cool air introduced into the passageway 17 toward the heater means 4.

The air mix chamber 18 is communicated with the cool air passageway 16 at an end thereof opposite the inlet of the cool air passageway and also with a lower floor-level air outlet. The lower floor-level air outlet opens in a portion of the casing 1 located below the heater means 4, and a floor door 9 is mounted for opening and closing the lower floor-level air outlet. Also, means is provided in the air mix chamber 18 for promoting or enhancing the mixing of cool air with warm air. In the embodiment shown and described herein, the air mix promotion means is in the form of a throttle plate 18a extending across the air mix chamber 18 and formed with an opening 18b.

Currents of air flowing through the embodiment of air conditioning apparatus shown and described hereinabove will now be described. Upon the blower means 2a being actuated, air is introduced into the casing 1 through the air inlet 2 either from the interior of the vehicle or from outside the vehicle depending on the position of the indoor/outdoor air change-over door 5. The air thus introduced passes all through the evaporator 3 to be cooled and have its moisture removed. Then, the cooled and dehumidified air is introduced into either the cool air heating passageway 17 or both of the cool air passageway 16 and the cool air heating passageway 17 depending on the position of the cooling change-over door 6.

When the change-over door 6 is actuated to open the cool air passageway 16, the major portion of the cool air current bypasses the heater means 4 and flows through the passageway 16 directly to the air outlet 31a or 31b from which the air current is released into the interior of the vehicle through an air duct, not shown. This reduces the resistance offered to the flow of air by the passageway, enabling the air current to be released in a large volume at a low noise level.

When the cool air passageway 16 is closed by the door 6, the cool air is all introduced into the cool air heating passageway 17. Depending on the extent to which the air mix door 7 is opened, part of the cool air thus introduced into the passageway 17 passes through the heater means 4 to become warm air and flow into the air mix chamber 18. The remaining part of the cool air is introduced through the bypass path to flow into the air mix chamber 18 as it is. The cool air having bypassed the heater means and the warm air therethrough are mixed with each other in the air mix chamber 18, and the mixture is released through the respective outlets depending on the positions of the vent-defroster change-over door 8 and the floor door 9.

By adjusting the opening extent of the air mix door 7 according to a desired temperature, it is possible to vary the mixing proportions of the warm air flowing through the heater means 4 and the cool air bypassing the heater means to effect the temperature control of the conditioned air. In this temperature control mode, as the bypass path of the passageway 17 is an only way for the cool air, the opening area of the passageway for allowing the same to flow is relatively small so that the cool air may meet with the flow resistance substantially same in magnitude as that offered by the heater means. Further, the throttle plate 18a in the air mix chamber 18 imposes restrictions on the flow of the mixture once before the air outlets, and the mixing of the cool air and the warm air can be performed more effectively. Consequently, it is possible to control the flow rate and temperature of the conditioned air released from the apparatus substantially in linear proportion to the opening extent of the air mix door 7.

Referring next to FIGS. 3a through 7b, currents of air flowing through the embodiment of the invention in different operation modes will be described.

Figure 2:
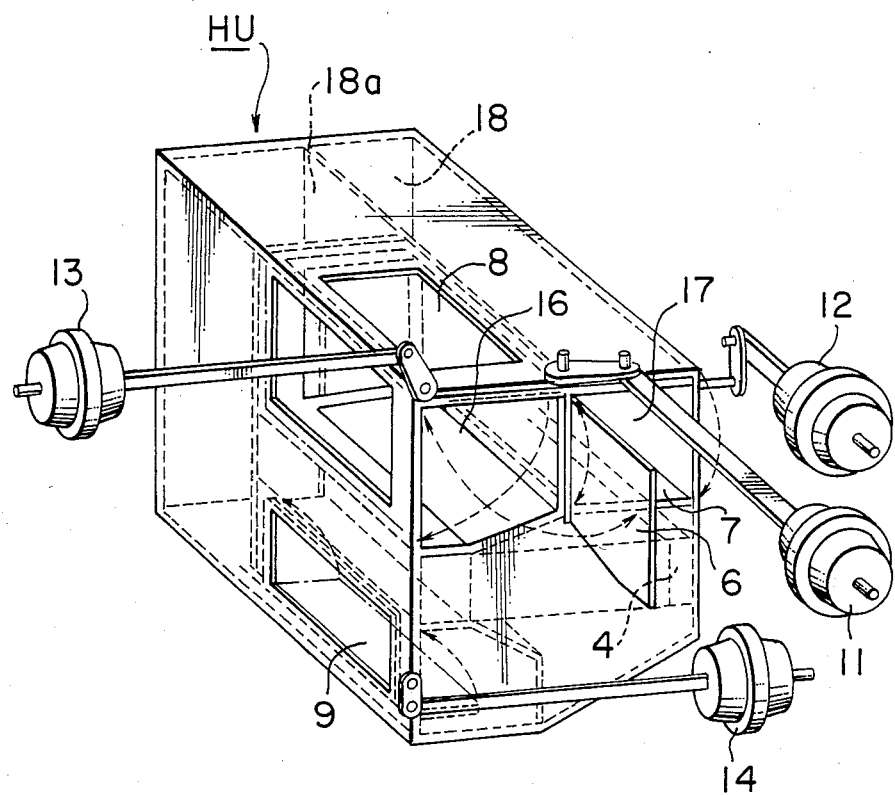
FIG. 2 is a perspective view of the heater unit of the embodiment shown in FIG. 1, and FIGS. 3a to 7b are schematic views showing air flows in respective operation modes of the embodiment of the air conditioning apparatus shown in FIG. 1.
Figure 3A:
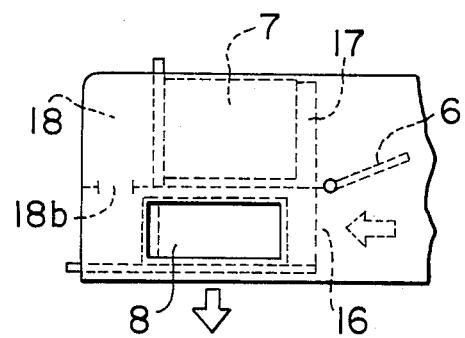
Figure 3B:
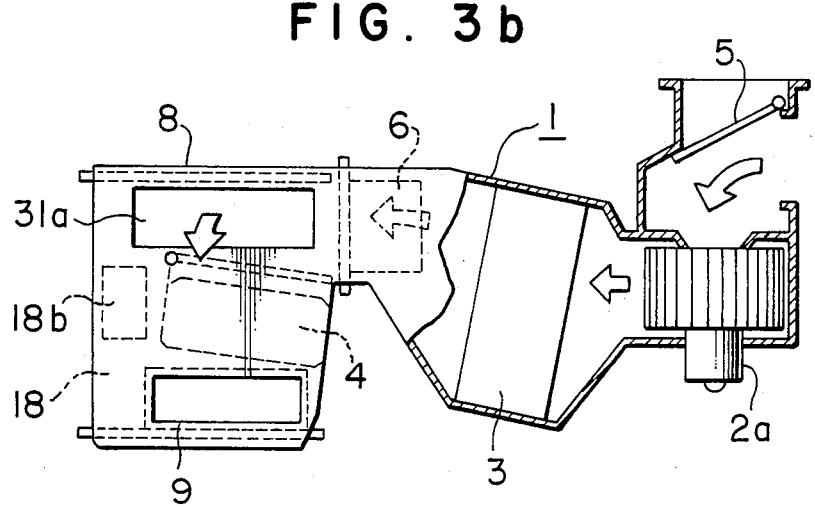

FIGS. 3a and 3b are a schematic side view and a schematic top view of the apparatus, respectively which show, like FIG. 2, the apparatus in a maximum cooling operation mode. In this operation mode, the cooling change-over door 6 is opened, and the vent/defroster change-over door 8 is moved to a position in which it opens the air vent 31a, while the lower floor-level air outlet is closed by the floor door 9. Thus, all the air that has flowed through the evaporator 3 bypasses the heater means 4, and the major portion of the cool air is directly released through the vent outlet 31a after flowing through the cool air passageway 16. In the maximum cooling operation mode, the indoor/outdoor air change-over door 5 is moved to an indoor air circulation position to quickly lower the temperature in the interior of the vehicle to a desired level.

Figure 4A:
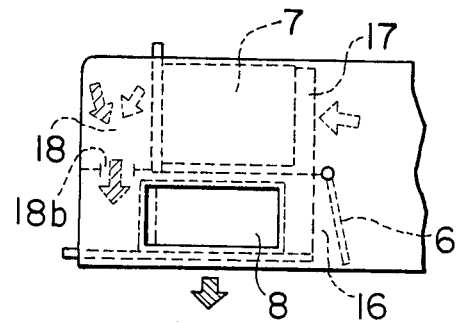
Figure 4B:
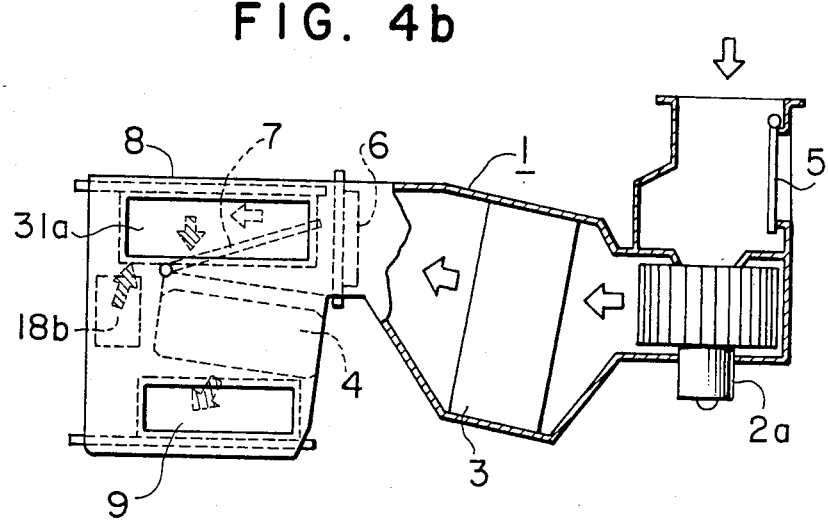

FIGS. 4a and 4b show the apparatus in an air vent release mode when temperature adjusting operation is being performed. In this operation mode, the indoor/outdoor air change-over door 5 is moved to an outdoor air introducing position to effect ventilation, and the cooling change-over door 6 is closed. Other doors are in the same positions as they were disposed in the maximum cooling operation mode described hereinabove. Thus the cool air is all introduced into the cool air heating passageway 17 and branches into two air current portions. One air current portion of the cool air flows above the air mix door 7 directly into the air mix chamber 18, while the other air current portion flows below the air mix door 7 through the heater means 4 into the air mix chamber 18. Thus, the temperature of conditioned air obtained by mixing the two air current portions in the air mix chamber 18 can be controlled by adjusting the degree of opening of the air mix door 7. The conditioned air that has had its temperature controlled in this way flows through the opening 18b of the throttle plate 18a and the cool air passageway 16, and is directed through the vent outlet 31a toward the upper half of the body of the rider.

Figure 5A:
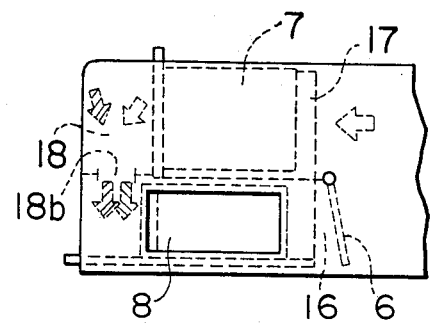
Figure 5B:
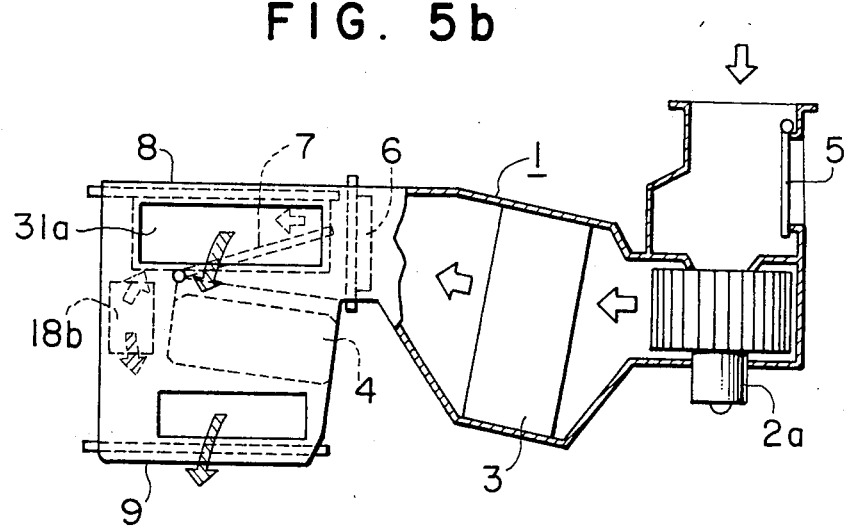

FIGS. 5a and 5b show the apparatus in a bilevel operation mode, in which the floor door 9 is open and other doors are in the positions where they were located in the air vent release mode described above. Thus the conditioned air having had its temperature controlled is released through both the vent outlet 31a and the lower floor-level air outlet.

Figure 6A:
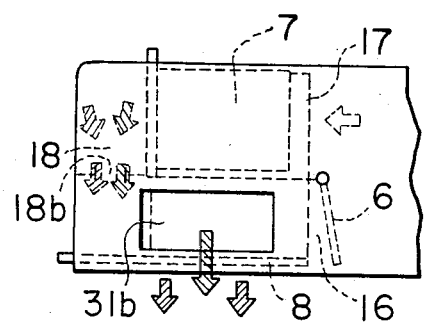
Figure 6B:
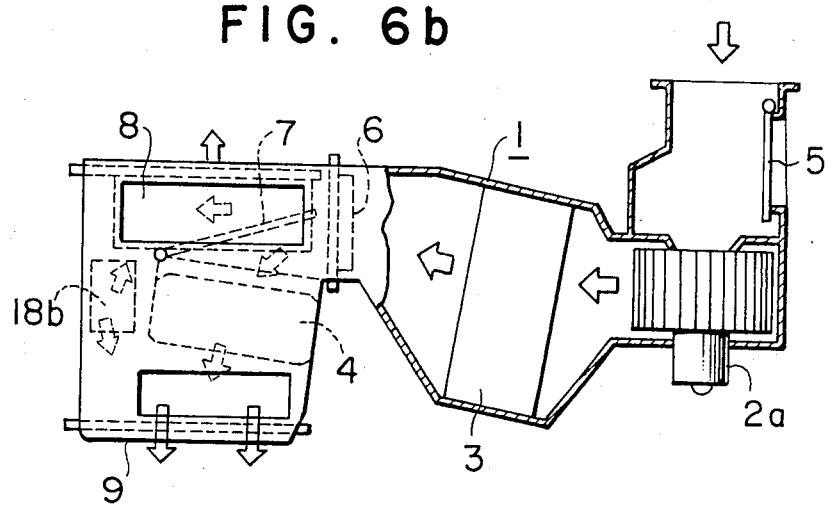

FIGS. 6a and 6b show the apparatus in a heating operation mode, in which the vent/defroster change-over door 8 is moved to a position where it opens the defroster outlet 31b. The conditioned air is released through the defroster outlet 31b to be directed against the windshield in order to prevent dimming thereof, and at the same time through the lower floor-level air outlet to be directed toward the feet of the rider.

Figure 7A:
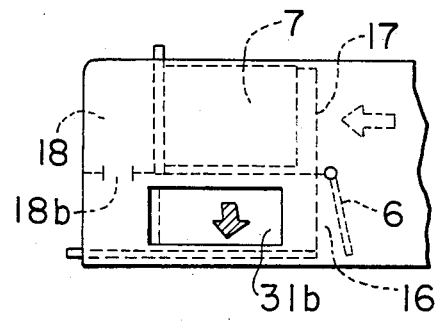
Figure 7B:
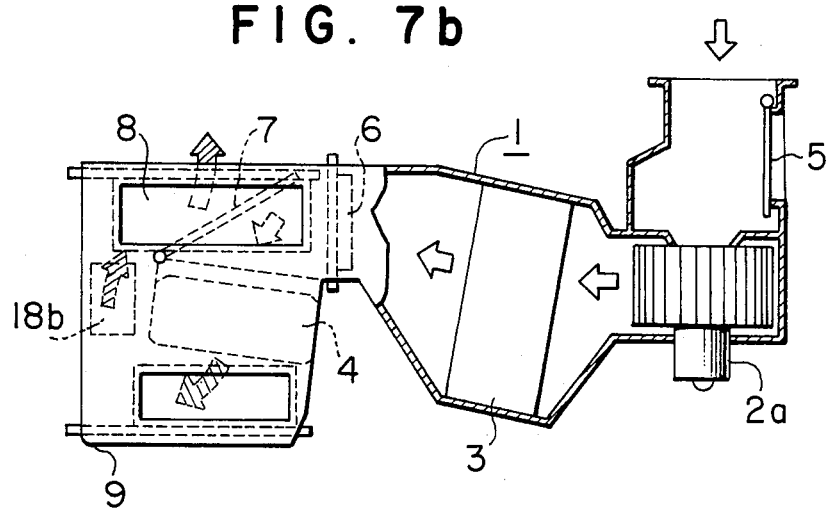

FIGS. 7a and 7b show the currents of air flowing in a defroster operation mode. In this operation mode, the conditioned air having had its temperature controlled is released through the defroster outlet 31b and directed against the windshield to prevent dimming thereof.

Referring to FIGS. 1, 1a and 1b again, a control system usable with the embodiment of the air conditioning apparatus shown and described hereinabove will be described.

The control system comprises a fan control, a temperature control and a mode control. Actuators 10, 11, 12, 13 and 14 of a subatmospheric pressure actuation type are drivingly connected to the indoor/outdoor air change-over door 5, cooling change-over door 6, air mix door 7, vent/defroster change-over door 8 and floor door 9, respectively. In order to facilitate the understanding of the operation conditions, these actuators are shown as being separated from the heater unit. In actual practice, however, they are mounted on the wall of the casing 1. Also, the heater means 4 has a warm water control valve 15 connected thereto.

The fan control or air flow rate control of the control system comprises a rheostat 19 and a blower control amplifier 20. The air flow rate control effects stepless control of an electric current flowing through power transistors in the blower control amplifier 20 by taking advantage of variations in the resistance of the rheostat 19, to thereby control the speed of the electric motor of the blower means 2a. On the other hand, the mode control comprises a latch type pushbutton switch 21, and a logic circuit 22. Mode control is effected by controlling the actuators 10–14 and valve 15 through a control of a solenoid valve assembly 23 performed by means of the switch 21 and logic circuit 22. Table 1 shows the manner in which the subatmospheric pressure is applied to solenoid valves 23a–23e in various operation modes.

TABLE 1

| Solenoid Valves | Mode | | | | |
|---|---|---|---|---|---|
| | VENT MAX COOL | AC | BI-LEVEL | FLOOR | DEF |
| 23a | ON | OFF | OFF | OFF | OFF |
| 23b | OFF | ON | ON | ON | ON |
| 23c | ON | OFF | OFF | OFF | OFF |
| 23d | ON | ON | ON | OFF | OFF |
| 23e | OFF | OFF | OFF | ON | OFF |

The temperature control comprises a temperature potentiometer 24, a control circuit 25 and a position potentiometer 12a attached to the actuator 12. Control of temperature is effected by operating the actuator 12 through a control of the control circuit 25 and solenoid valves 23f and 23g so as to bring the potential difference between the temperature potentiometer 24 and the potentiometer 12a of the actuator 12 to zero.

The control of temperature effected by the control system of the aforesaid construction in the air vent mode will be described.

When the vehicle is left standing in the sun and the temperature therein has risen to a high level, the air conditioning system is operated in the maximum cooling operation mode. To this end, a VENT button of the switch 21 is depressed to turn on, and an A/C switch is also depressed. A TEMP lever of the potentiometer 24 and a FAN lever of the rheostat 19 are set at MAX COOL and HI positions, respectively. As a result, the solenoid valves 23a, 23c and 23d are turned on as shown in Table 1, thereby rendering the actuators 10, 11 and 13 operative. This moves the indoor/outdoor air change-over door 5 to the indoor air circulation position and opens the cooling change-over door 6, thereby releasing the cool air through the vent outlet 31a.

More specifically, as the TEMP lever is set at the MAX COOL position, a minus (⊖) side of the solenoid valve 23a is forcedly grounded and the actuator 10 is rendered operative, so that the indoor/ourdoor air change-over door 5 is moved to the indoor air circulation position as indicated by broken lines in FIG. 1. At the same time, the warm water control valve 15 of a normally open type is actuated to block an inflow of warm water into the heater means 4. Depressing the A/C switch actuates an air conditioning relay 27 to engage a magnet clutch 28. This renders operative the refrigeration cricuit, not shown, so that heat exchange is performed between the introduced air and the evaporator 3 and cool air is supplied to the heater unit HU. When the TEMP lever is set at the MAX COOL position, the air mix door 7 moves to the position in which it entirely closes the heater means 4.

After the temperature in the interior of the vehicle has fallen following the aforesaid operation of the system, the FAN lever is moved to a LOW position. If the temperature in the interior of the vehicle is kept falling beyond one's preference even after the movement of the FAN lever, then the TEMP lever of the potentiometer 24 is moved to a position intermediate between COOL and HOT positions, thereby adjusting the temperature of the conditioned air to a level which would create a comfortable atmosphere inside the vehicle. As the TEMP lever is moved from the MAX COOL position to a temperature adjusting range, the solenoid valve 23a is released from the forcedly grounded condition thereof and the solenoid valve 23b is turned on as shown in Table 1. This moves the indoor/outdoor air change-over door 5 to the outdoor air introduction position and turns off the warm water control valve 15, thereby allowing warm water to flow into the heater means 4 and finishing the preparation for adjusting the temperature of the conditioned air.

In this control system, the air mix door 7 is driven by the actuator of a subatmospheric pressure power servo type which operates as follows.

When no subatmospheric pressure is being applied to the actuator 12, the air mix door 7 is located in a FULL-HOT position in which it directs all the cool air toward the heater means 4, and a fraction of voltage acting on the potentiometer 12a which is linked to the actuator 12 becomes high. Therefore, application of a subatmospheric pressure to the actuator 12 renders the same operative to move the potentiometer 12a to reduce its fraction of voltage. That is, the position of the actuator 12 can be detected by means of the potentiometer 12a. Meanwhile, the potentiometer 24 of the TEMP lever is set, like the potentiometer 12a of the actuator 12, such that a fraction of voltage of a common terminal thereof becomes lower as the TEM lever moves from the HOT position to the COOL position.

In the control system shown and described herein, the voltage on the potentiometer 12a linked to the actuator 12 and the voltage on the potentiometer 24a of the TEMP lever are compared with each other at the control circuit 25. When the difference in voltage between the two potentiometers is positive, the solenoid valves 23f and 23g are simultaneously turned on. On the other hand, when the difference is negative, only the solenoid valve 23g is turned on. The valve 23f is a three-way valve for switching form atmospheric pressure to subatmospheric pressure and vice versa in producing an output, and the valve 23g is an on-off valve for controlling the air outlet thereof. The solenoid valves 23f and 23g are connected to each other at their outlet ports, and the three-way valve 23f has a subatmospheric pressure applied to its inlet port while the outlet port of the on-off valve 23g is connected to the actuator 12.

As the TEMP lever is moved to the COOL position and the potential difference of the potentiometers becomes positive, therefore, the solenoid valves 23f and 23g are simultaneously turned on, so that a subatmospheric pressure is applied to the actuator 12 to drive the same toward the COOL position. At a point of time at which the potential difference between the temperature potentiometer 24 and potentiometer 12a becomes zero, the solenoid valves 23f and 23g are turned off, thereby rendering the actuator 12 inoperative.

Likewise, as the TEMP lever is moved toward the HOT position, the potential difference between the potentiometers becomes negative, thereby turning on only the solenoid valve 23g. The solenoid valve 23f is kept turning off and the atmospheric pressure is applied to the outlet port thereof which is connected to the valve 23g. As a result, the atmospheric pressure is led through the valve 23f to the actuator 12, which is moved toward the HOT position. The actuator 12 is rendered inoperative when the potential difference between the potentiometers becomes zero.

From the foregoing description, it will be appreciated that the air conditioning apparatus for automotive vehicles of the aforesaid construction according to the invention comprises a casing which houses heater means therein and the air passageway of which is divided to define a cool air passageway. This arrangement enables cool air currents to be led directly to air outlets without much resistance offered to their flow while eliminating the need to increase the volume of the apparatus. Additional advantages offered by the invention are that it is possible to reduce noises and economize on power consumption for operating the blower when the apparatus is operated particularly in the maximum cooling operation mode, and that control of the conditioned air released through the air outlets can be effected with increased precision.

While the invention has been described by referring to a preferred embodiment thereof, it is to be understood that the invention is not limited to the specific form of the embodiment shown and described hereinabove, and that many changes and modifications may be made therein by one ordinary skill in the art without departing from the scope of the invention claimed. A control device that can be used with the air conditioning apparatus according to the invention has been described as using a subatmospheric pressure as a drive source. However, the control system usable with the invention is not limited to this specific form of control system and any other suitable control system, such as the one which uses manually operated levers for directly moving the doors, may be used.

What is claimed is:

1. An air conditioning apparatus for automotive vehicles, comprising:
   a casing formed with an air inlet and air outlets and defining an air passageway between said air inlet and said air outlets;
   blower means for introducing air through said air inlet into said casing and delivering the same through said air outlets;
   heater means provided in said air passageway of said casing for heating air introduced into the casing; and
   air mix door means for regulating flow rate of air passing through said heater means and flow rate of air bypassing the same, said heater means heating the air flowing therethrough to provide warm air which is mixed with cool air bypassing the heater means to provide conditioned air whose temperature is controlled by varying proportions of the warm air and cool air mixed with each other, wherein a cool air heating passagaeway and a cool air passageway are formed by dividing said air passageway in said casing along a direction of flow of the air introduced into the casing, said cool air heating passageway has a passage portion in which said heater means is mounted, another passage portion bypassing said heater means and said air mix door means mounted therein, said cool air passageway is connected to said air outlets for exclusive use of allowing at least a part of the cool air to bypass said cool air heating passageway and to directly lead the cool air to said outlets, and door means for opening and closing said cool air passageway is provided.

2. An air conditioning apparatus for automotive vehicles as claimed in claim 1, wherein said door means for opening and closing the cool air passageway is located at an inlet of the cool air passageway.

3. An air conditioning apparatus for automotive vehicles as claimed in claim 1, further comprising means provided in the cool air heating passageway in a portion thereof which is located upstream of the air outlets for promoting mixing of the warm air with the cool air.

4. An air conditioning apparatus for automotive vehicles as claimed in claim 3, wherein said means for promoting the mixing of the warm air with the cool air comprises a throttle plate.

* * * * *